United States Patent
DiSanto et al.

(10) Patent No.: US 8,184,723 B2
(45) Date of Patent: May 22, 2012

(54) FEEDBACK SYSTEM AND APPARATUS FOR VIDEO COMPENSATION

(75) Inventors: Gregory Lawrence DiSanto, Tewksbury, MA (US); Jonathan D. Pearson, Topsfield, MA (US); Robert Briano, Haverhill, MA (US)

(73) Assignee: Analog Devices, Inc., Norwood, MA (US)

( * ) Notice: Subject to any disclaimer, the term of this patent is extended or adjusted under 35 U.S.C. 154(b) by 595 days.

(21) Appl. No.: 12/395,279

(22) Filed: Feb. 27, 2009

(65) Prior Publication Data

US 2009/0219980 A1   Sep. 3, 2009

Related U.S. Application Data

(60) Provisional application No. 61/032,645, filed on Feb. 29, 2008.

(51) Int. Cl.
*H04B 3/00* (2006.01)

(52) U.S. Cl. ........ 375/257; 375/224; 375/229; 375/230; 375/232; 375/233; 375/259; 348/518; 348/607; 348/613; 333/15; 333/18; 333/28 R; 324/543; 324/616

(58) Field of Classification Search .................. 375/224, 375/229, 230, 232, 233, 257, 259; 348/518, 348/607, 613; 324/543, 616; 333/15, 18, 333/28 R
See application file for complete search history.

(56) References Cited

U.S. PATENT DOCUMENTS

| | | | | |
|---|---|---|---|---|
| 4,151,490 A | 4/1979 | Bazin | | 333/16 |
| 4,434,438 A | 2/1984 | Rzeszewski | | 358/167 |
| 4,996,497 A | 2/1991 | Waehner | | 330/151 |
| 5,124,673 A | 6/1992 | Hershberger | | 333/18 |
| 5,343,236 A | 8/1994 | Koppe et al. | | 348/6 |
| 6,864,689 B2 | 3/2005 | Stephen et al. | | 324/616 |
| 6,879,630 B2 | 4/2005 | Kokuryo et al. | | 375/231 |
| 7,221,389 B2 | 5/2007 | Ahern et al. | | 348/192 |
| 7,249,167 B1 | 7/2007 | Liaw et al. | | 709/218 |
| 7,440,035 B2 | 10/2008 | Mori | | 348/518 |
| 2005/0132087 A1 | 6/2005 | Glinski et al. | | 709/238 |
| 2005/0134748 A1 | 6/2005 | Hoerl | | 348/734 |
| 2006/0245517 A1 | 11/2006 | Ikedo et al. | | 375/297 |
| 2007/0052849 A1 | 3/2007 | Craddock et al. | | 348/536 |
| 2007/0296868 A1 | 12/2007 | Hall | | 348/685 |
| 2007/0296869 A1 | 12/2007 | Hall | | 348/685 |
| 2007/0300284 A1 | 12/2007 | Hall et al. | | 725/149 |
| 2008/0060050 A1 | 3/2008 | Briano et al. | | 725/149 |

FOREIGN PATENT DOCUMENTS

EP         1 329 732 A1     7/2003

(Continued)

OTHER PUBLICATIONS

Analog Devices, Inc., AD8123 Triple Differential Receiver with Adjustable Line Equalization datasheet, published by Analog Devices, 2007, 16 pages.

(Continued)

*Primary Examiner* — Leon Flores
(74) *Attorney, Agent, or Firm* — Sunstein Kann Murphy & Timbers LLP

(57) ABSTRACT

A system and apparatus for compensating cable losses in a video signal transmission system includes feedback circuits to determine the spectral attenuation of a received signal and to control an equalizer circuit to amplify selected frequencies of the received signal, and to determine the various times of arrival of two or more video signals and selectively adjust one or more delay lines to reduce the differences in their arrival times.

3 Claims, 14 Drawing Sheets

FOREIGN PATENT DOCUMENTS

EP    1 646 230 A1    4/2006
GB    2 429 868 A    3/2007

OTHER PUBLICATIONS

Intersil, EL9110 Differential Receiver/Equalizer datasheet, published by Intersil, Nov. 30, 2007, 10 pages.
Crawford, James, The Phase/Frequency Detector, Feb. 1985, 9 pages.
Motorola, MCH12140, MCK12140 Phase-Frequency Detector datasheet, Motorola 1997, 4 pages.
Semiconductor Components Industries, LLC and ON Semiconductor, MCH12140, MCK12140 Phase-Frequency Detector datasheet, ON Semiconductor, Jul. 2006, 5 pages.
Authorized Officer Alexandre Bouffier, International Search Report and Written Opinion of the International Searching Authority, PCT/US2009/035534, Jun. 8, 2009, 13 pages.

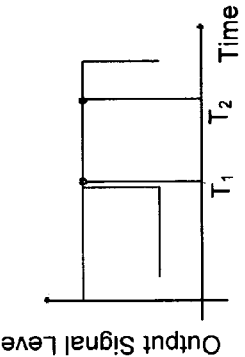
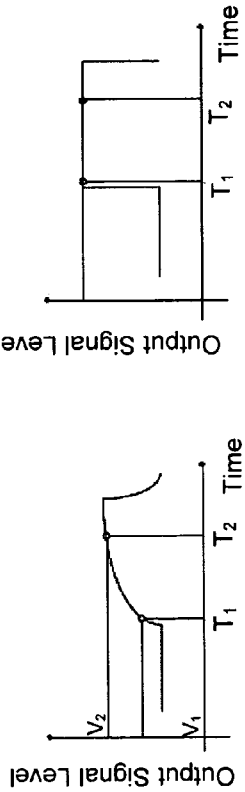
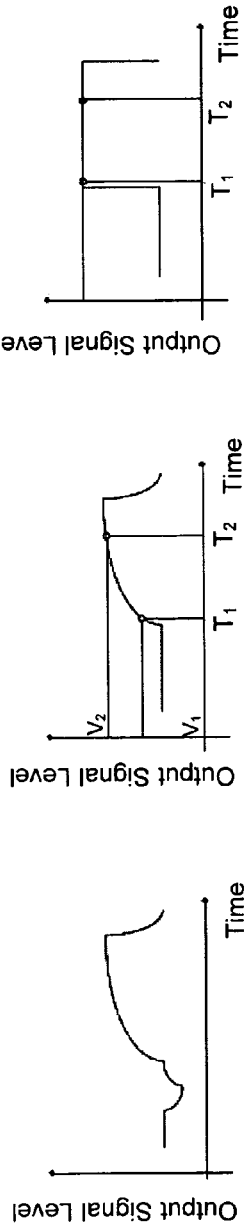
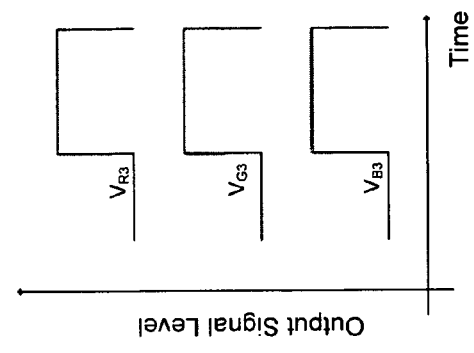
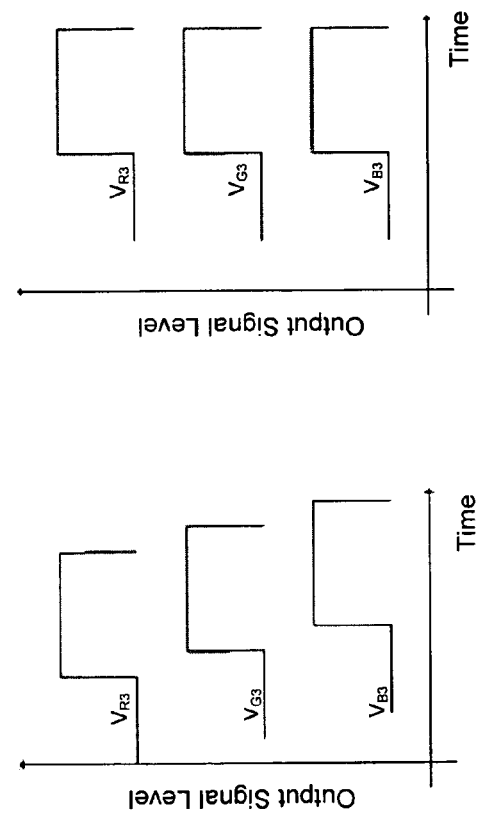

FEEDBACK SYSTEM AND APPARATUS FOR VIDEO COMPENSATION

PRIORITY

This application claims priority from U.S. provisional application 61/032,645, entitled Automatic Video Compensation and filed Feb. 29, 2008 in the names of Gregory Lawrence DiSanto, Jonathan D. Pearson, and Robert Briano, and which is incorporated herein by reference in its entirety.

TECHNICAL FIELD

The present invention relates to transmission of video signals, and more particularly, to compensation for signal losses and skew in video signals transmitted on conductors.

BACKGROUND

Transmitting video signals over unshielded twisted pair ("UTP") cable is advantageous for a variety of reasons. UTP has become ubiquitous in modern business and residential settings. For example, CAT5 cable (a type of UTP cable) includes several twisted pair conductors, and may be used, for example, to transmit keyboard, video monitor, and mouse ("KVM") signals within a computer system. Cost savings for UTP cabling over, for example, coaxial cabling, can be significant.

Two issues that may arise when transmitting video over UTP are nonlinear signal attenuation and signal time skew.

Signal attenuation is caused by the frequency domain characteristics of the cable, and may be thought of as a type of signal distortion in the frequency domain. For example, if the cable is low-pass in nature, attenuation of the higher frequencies within a signal may cause a loss of information, such as a loss of definition of the rising edges of impulses.

The time skew as between two signals being transmitted on different twister pairs within a UTP cable may be caused by the different physical lengths of cable pairs within the UTP cable. The time skew may cause like features of the two signals to reach the end of the UTP cable at different times. This may be thought of as a type of signal distortion in the time domain.

FIG. 1 shows a signal chain 100 with equalization 103 to compensate for the signal attenuation, and a delay line 104 to compensate for the signal time skew. FIG. 2 shows a typical line of video (e.g. a white line), and how the signal may look at different points in the signal chain (a-d). The circuit 100 of FIG. 1 requires a user to manually calibrate/adjust the "Equalizer Adjust" and "Delay Line Adjust" inputs to get acceptable picture quality.

SUMMARY OF THE INVENTION

In a first embodiment of the invention there is provided a feedback circuit for compensating for time domain and frequency domain distortion of a signal received over UTP. Time skew among several signals may be addressed by delaying the earliest-arriving signals so that they arrive at approximately the same time as the last-to-arrive signal. Frequency attenuation may be addressed by selectively amplifying the frequencies that were attenuated during transmission over UTP, such that the amplification approximates the inverse frequency response of the UTP cable.

In embodiments of the invention, feedback systems and methods for compensating for skew in video signals transmitted over conductors include injecting a calibration pulse signal (which may also be known as a "test signal") into the vertical blanking interval ("VBI") of each of the video signals before the signals are transmitted over UTP. A signal with an injected calibration pulse may be known as an "aggregate signal" or "composite signal." Applying compensation includes determining the order of arrival of the leading edge of the calibration signal pulse on each line using a delay detector, and selectively delaying the earlier-arriving signals until all signals exit the delay line at substantially the same time. In other words, using a control loop, the delay difference (i.e., difference in arrival time of the leading edge of the calibration signal pulse) is forced towards zero.

In embodiments of the invention, feedback systems and methods for compensating attenuation in video signals transmitted over conductors include injecting a calibration signal pulse into the vertical blanking interval of a video signal before the signals are transmitted over UTP (which may be the same calibration pulse injected for use in the skew compensation). The aggregate signal is then transmitted to a receiver over conductors within a UTP cable, where the receiver includes an amplifier with gain that is frequency dependent. Applying compensation includes measuring the slope of the top of the calibration signal pulse and, through a feedback system, varying amplifier gain to drive the slope of the calibration pulse towards zero (or in other words, reduce the magnitude of the slope of the calibration pulse). In some embodiments, the process may be repeated until the pulse slope is less than a threshold value. The threshold value represents a slope of the calibration pulse which, in turn, represents a level of distortion that is acceptable in the system, according to the requirements and specifications of the system being implemented. The amplifier gain is frequency dependent and is ideally inverse to that of the cable loss. Ideally, the resulting frequency response of the entire system would be flat over frequency.

In an embodiment of the invention, measuring the slope of the calibration signal pulse includes measuring a first point and a second point on the top of the calibration signal pulse and calculating the difference between the voltages of the two points.

In embodiments of the invention, the frequency-domain compensation is applied prior to detecting the arrival of the edge of the calibration pulse, so that the leading edge of the calibration pulse is more clearly defined by its higher-frequency components. In some embodiments, a coarse skew compensation may be applied prior to measuring the slope of calibration pulse, so as to improve the accuracy of the sampling timing.

BRIEF DESCRIPTION OF THE DRAWINGS

The foregoing features of the invention will be more readily understood by reference to the following detailed description, taken with reference to the accompanying drawings, in which:

FIG. 4A, FIG. 4B and FIG. 4C illustrate determining equalizer compensation settings for signal attenuation, in the embodiment of FIG. 3;

FIG. 5A and FIG. 5B illustrates delay line compensation settings for signal skew, in the embodiment of FIG. 3;

DETAILED DESCRIPTION OF SPECIFIC EMBODIMENTS

In various embodiments of the invention, signal attenuation in a video cable and signal skew between video cables are determined and compensated by a feedback system that uses a calibration pulse.

As known by those skilled in the art, component video is a type of analog video format that is transmitted or stored as three or more separate signals. For example, a component video signal may comprise separate red, blue, and green signals. Of course, other types of component video signals may be used. Some signals discussed herein may include, for example, features such as vertical blanking intervals, vertical sync pulses and horizontal sync pulses, although some embodiments do not require the signal being processed to include such features. As one example, in some signals a horizontal sync ("HSync") pulse may or may not be present, but the signal may be shown with the calibration pulse in the vertical blanking interval in order to identify the beginning of a scan line within the vertical blanking interval. Discussion of one specific type of video signal therefore is illustrative and not intended to limit various embodiments.

Figure 1:
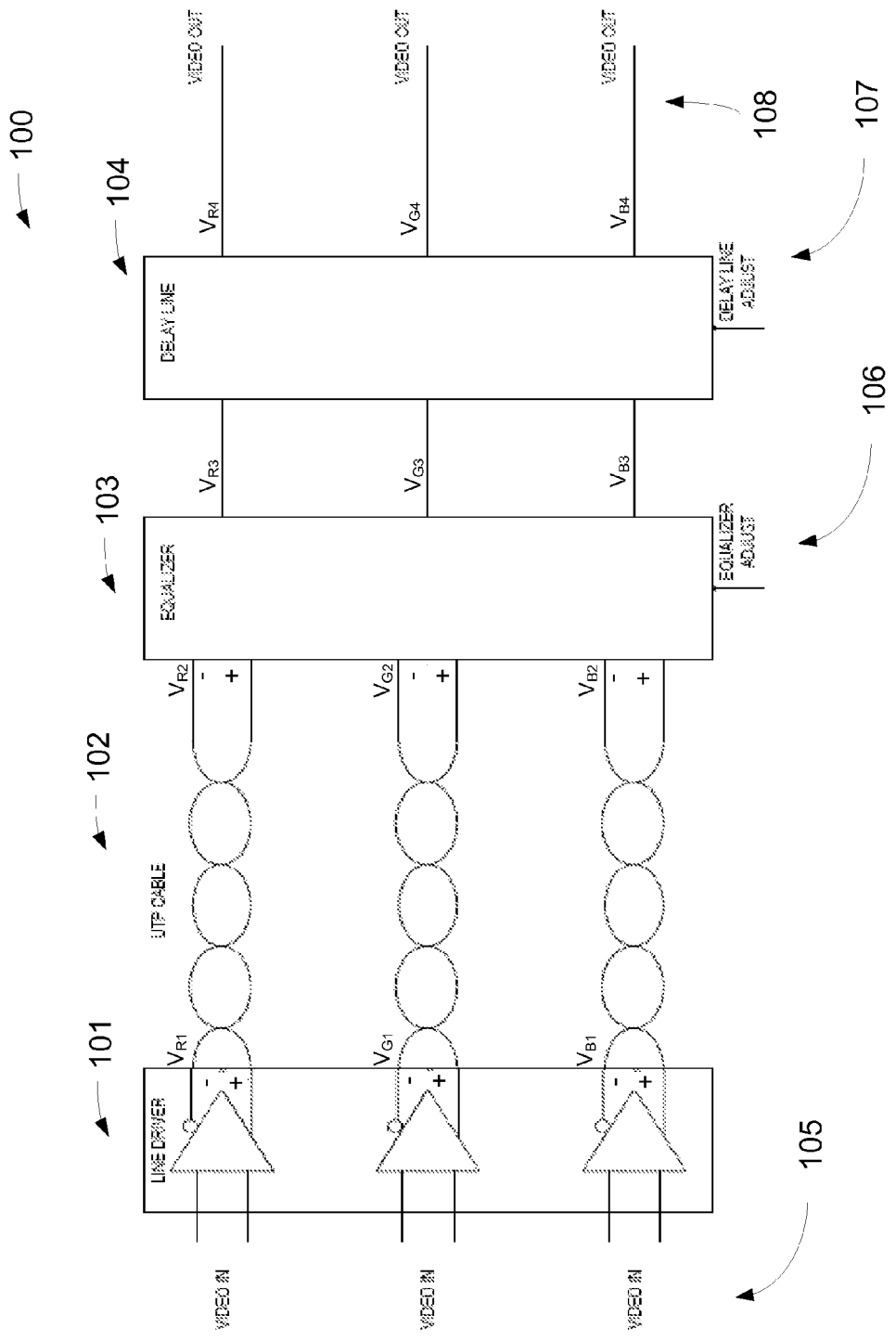
FIG. 1 is a conventional equipment organization for compensating video signals on conductors.
Figure 2:
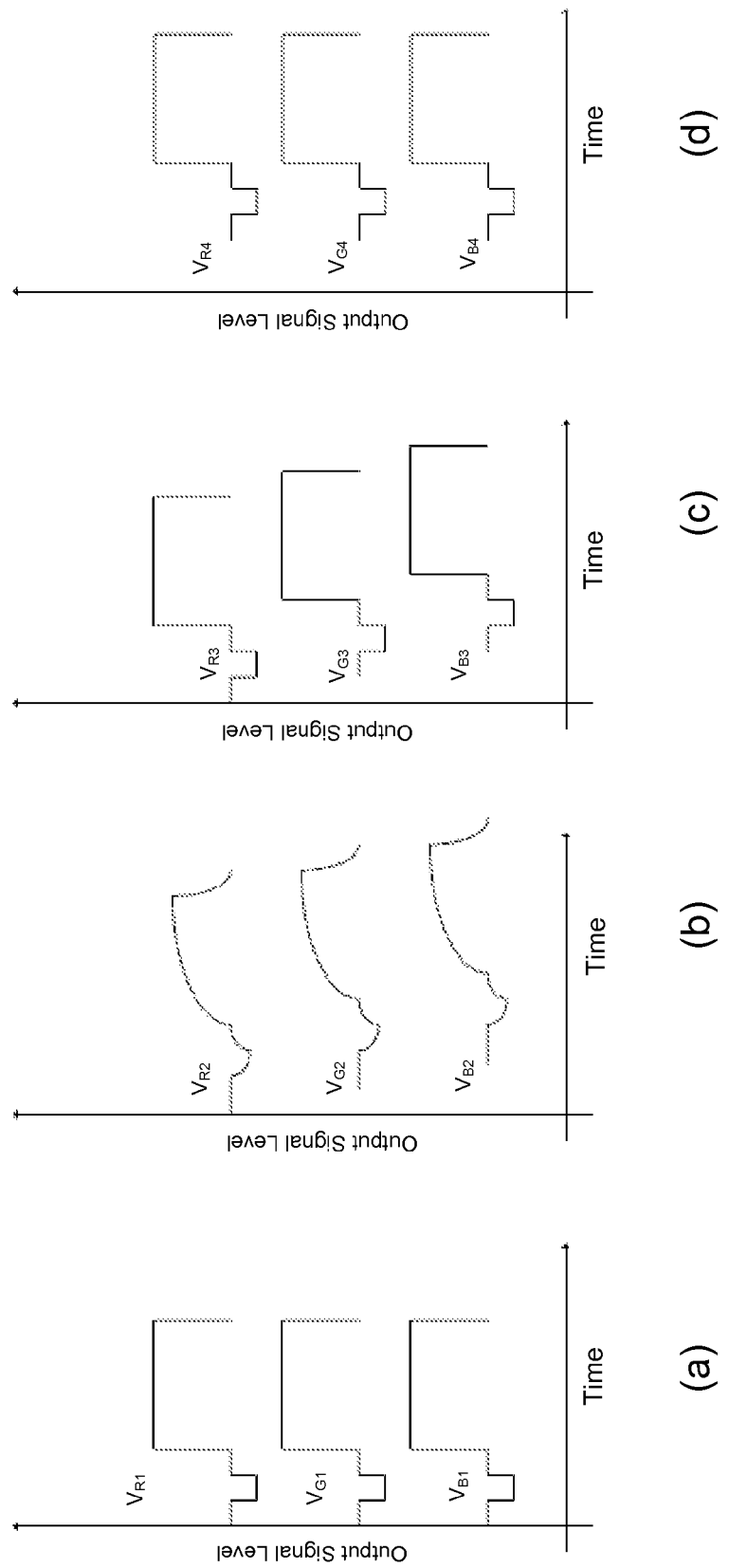
FIG. 2 shows the video signal at various points [(a), (b), (c) and (d)] in the system of FIG. 1.
Figure 3:
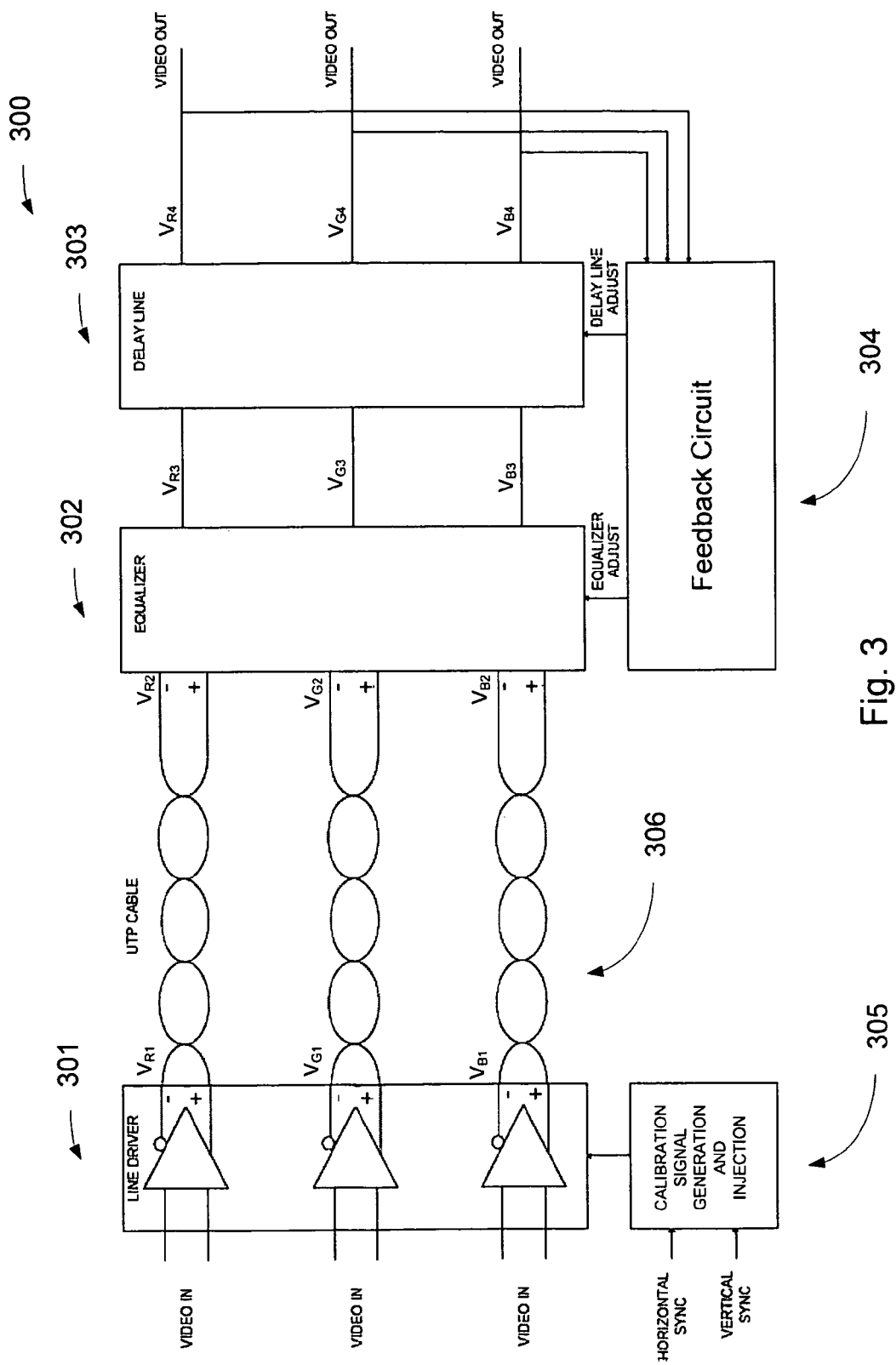
FIG. 3 is a block diagram of a system for compensating video signals, according to an embodiment of the invention.

A block diagram 300 for the signal chain for a system employing this method is shown in FIG. 3, according to an embodiment of the invention. Various embodiments of elements of the signal chain illustrated in FIG. 3 will be described below. Although FIG. 3 shows a signal chain 300 with an equalizer 302 followed by a delay line 303, some embodiments may put the delay line 303 first, followed by the equalizer 302. In some embodiments, the equalizer circuit 302, the delay line circuit 303, and a feedback circuit 304 form a single feedback loop.

Video signals are received at line drivers 301. In some embodiments, a Calibration Signal Generation and Injection circuit 305 generates a calibration signal (for example, calibration pulse), which is combined with the received video signals and transmitted onto the signal lines, which are, in this case, UTP cables 306.

A feedback circuit 304 assesses certain characteristics of the signal after its transmission across the UTP cable 306, and sends controlling signals (e.g., "Equalizer Adjust" and "Delay Line Adjust") to equalizer 302 and delay line 303 circuits to compensate for attenuation and skew, respectively. The equalizer circuit 302 may selectively amplify a range of frequencies to counter the attention cause by the UTP cable 306. The delay line 303 may delay some of the incoming signals so that they all exit the delay line 303 at substantially the same time.

In some embodiments, the feedback circuit 304 analyzes the calibration pulse, which has suffered the same attenuation and skew as the other portions of the video signal. The feedback circuit 304 then dynamically determines "Equalizer Adjust" and "Delay Line Adjust" settings.

FIGS. 4A, 4B and 4C graphically illustrate the equalizer compensation process. FIG. 4A shows the received line of video, containing the calibration signal pulse. This signal could be on any one of the three video lines, but only the signal on one video line is shown for clarity. FIG. 4B shows the calibration signal pulse independently of other components of the video signal. Two sample points (T1 and T2) are shown, and together specify a slope. If the slope is positive, higher gain is applied to the higher frequencies of the signal, and if the slope is negative the gain for the higher frequencies of the signal is reduced. The control loop forces this difference in the two points towards zero by adjusting the gain of an amplifier which has different levels of gain at different frequencies, such that the slope of the top of the test pulse approaches zero.

FIGS. 5A and 5B illustrate the skew compensation process. A delay detector is used to determine the order of calibration signal edge arrival, and from this information a decision is made which signals to delay. The control loop here forces the arrival time difference between the channels to zero.

Aspects of various embodiments are described in more detail, below. For clarity, some aspects of some embodiments may be discussed with regard to a single signal line, with the understanding that the same may apply to one or more signal lines.

The calibration pulse provides a signal of known characteristics that can be evaluated by the feedback circuit. The calibration signal in some embodiments comprises one or more positive-going voltage pulses injected into the active video space on the applicable signal line. Some prior art approaches calibrate by measuring features inherent in the video signal being transmitted (for example, measuring the horizontal sync or vertical sync pulses themselves). However, these approaches assume the fidelity of that portion of the video signal at the point of transmission, which may not always be a valid or desirable assumption. In contrast, injecting a calibration pulse of known amplitude and duration may yield a more reliable basis for implementing feedback. Also, using a negative-going sync pulse may only work in some applications if the sync pulse is transmitted down the line differentially with the video, which is not always the case, since some applications do not transmit signals differentially, or may not permit signals to be transmitted differentially. In contrast, injecting a positive-going calibration pulse of known amplitude and duration can be done without the need to transmit the signal differentially.

The calibration pulse may be inserted in any place in the video signal where it will not cause unacceptable (as determined according to the specific signal being transmitted) interference with the video data being transmitted. Controlling the location of the calibration pulse may be desirable, for example, to avoid corruption in the calibration pulse due to other signals in the system, or to avoid corruption in other signals in the system due to the calibration pulse. In some embodiments, the calibration pulse may be placed in one or more lines of video, either within or outside of the vertical blanking interval. Alternately, the calibration pulse may be inserted in the active video space. Either approach will inherently allow for a wider pulse as compared to using a horizontal sync pulse as the calibration signal. This is advantageous when trying to determine the slope of the top of the calibration signal pulse since it allows for the points to be spaced further apart. Also, as video resolution increases, the horizontal sync pulse width decreases, making it more difficult to perform gain and skew adjustment using the horizontal sync pulse.

The equalizer 302 selectively amplifies frequency components of the signal as a function of a signal from the feedback circuit (e.g., "Equalizer Adjust"). The equalizer 302 may be adapted to amplify some parts of the frequency spectrum more or less than other parts of the frequency spectrum. For example, equalizer 302 may controllably amplify frequencies greater than twice the fundamental frequency of the calibration pulse more than frequencies less than twice the fundamental frequency of the calibration pulse. Alternately, equalizer 302 may controllably amplify frequencies greater than 1 MHz more than it amplifies frequencies less than 100 kHz, as in FIG. 6B. In some embodiments, the "Equalizer Adjust" signal is obtained by forcing the top of the received calibration signal pulse to be flat (i.e., zero slope) by means of a control loop.

Figure 6A:
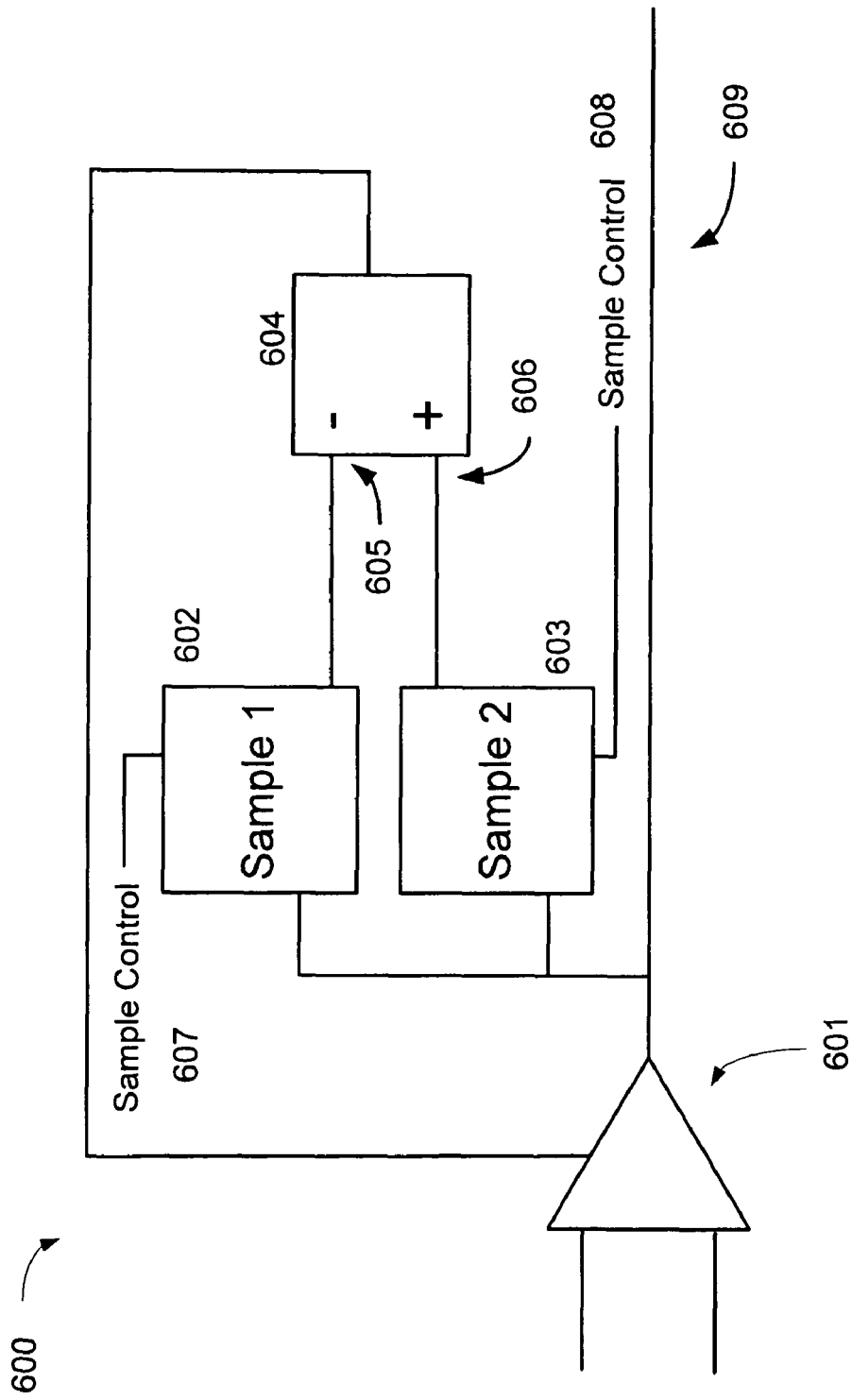
FIG. 6A schematically illustrates an equalizer circuit.
Figure 6C:
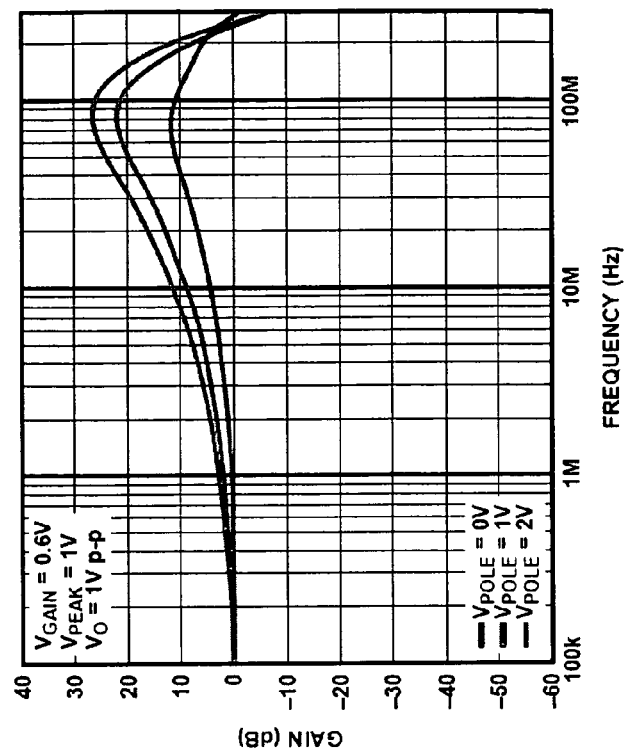
FIG. 6C illustrates an alternate variable frequency response of an amplifier that may be useful in an equalizer circuit.
Figure 6B:
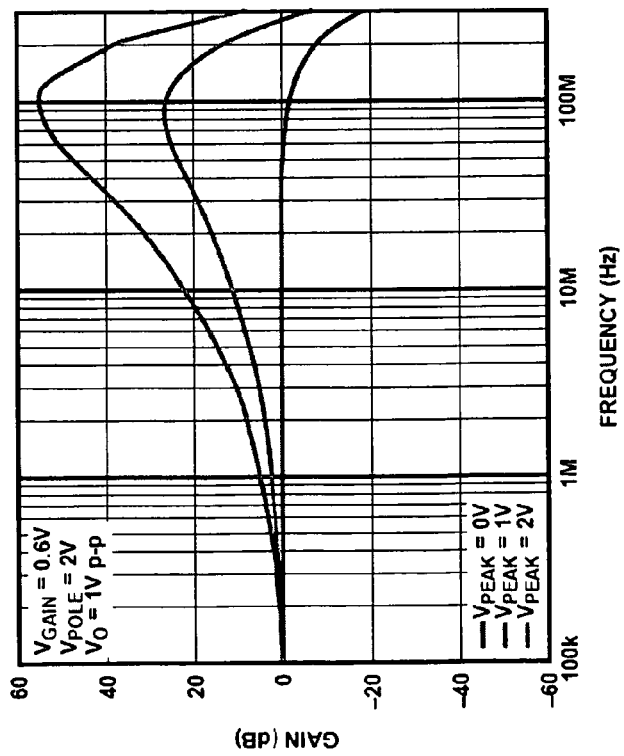
FIG. 6B illustrates the variable frequency response of an amplifier that may be useful in an equalizer circuit.

One embodiment of an equalizer circuit 600 is schematically illustrated in FIG. 6A, which also schematically illustrates elements of the feedback circuit. A signal is received at a differential amplifier 601 directly from a UTP channel (see, for example, FIG. 3). The amplifier 601 includes circuitry that can be adjusted to vary its gain at different frequencies, such as the AD8123 available from Analog Devices, Inc., in which various gain stages are summed together to approximate the inverse frequency response of the cable. For example, the AD8123 has a "Vpeak" input that responds to an increase in its input voltage by increasing the gain of the amplifier at the upper end of its frequency range, as illustrated in FIG. 6B. The AD8123 also has a "Vpole" input that also responds to an increase in its input voltage by increasing the gain of the amplifier at the upper end of its frequency range, as illustrated in FIG. 6C. By managing the voltages at these inputs, the user of the AD8123 can selectively amplify high frequency components of an input signal.

In the circuit 600 of FIG. 6A, the output of the equalizer amplifier 601 (for example, as in FIG. 8A) is sampled at two distinct times; first within the rising edge or early part of the calibration pulse (sample 1), and second some time after the rising edge of the calibration pulse (sample 2). The precise timing of the two samples will be determined according to the application, anticipated skew, and the width of the calibration pulse. The sampling circuit 602 or 603 could be a sample-and-hold amplifier as known in the art, or an analog-to-digital (A/D) converter to capture and digitize the sample. In an analog loop, the output of the A/D converter could be coupled to the input of a digital-to-analog (D/A) converter to hold the sample for an extended time. In a digital embodiment, the output of the A/D converter could be coupled to a memory, digital register, digital subtraction circuit or digital signal processor (DSP) for further processing of the data. In some embodiments, a single sampling circuit may take both samples and store them separately. In some embodiments, two separate sampling circuits (for example, 602 and 603) could be used.

The two samples are input to a subtractor controller circuit 604 that determines the difference between the second sample and the first sample and provides suitable control circuitry, possibly with high gain, so as to drive the amplifier (equalizer) in such a way that minimizes the magnitude of the difference between the two samples. The subtraction circuit of subtractor controller 604 could be an analog subtraction circuit along with analog control circuitry that may or may not include an amplifier or amplifiers with high gain, as known in the art or, if the sample has been digitized, the subtraction circuit could be a digital subtraction circuit, including a digital logic circuit or a programmed digital signal processor, as known in the art.

If the signal had not been attenuated at its higher frequencies, the first sample would be substantially identical to the second sample. However, as the high frequency components of the calibration pulse are attenuated by the UTP cable, the leading edge of the calibration pulse will become less distinct, so that its rise time will be slower, and the first sample (taken within the rising edge) will be less than the second sample (taken after the calibration pulse has had time to rise to its nominal level). Therefore, the difference between the second sample and the first sample represents the slope of the received calibration pulse. That slope can be used to determine the amount of attenuation, and therefore the amount of frequency-dependent amplification needed to restore the spectrum of the signal. Therefore, the voltage difference between the first sample and the second sample is used to generate a control signal that may be fed back to the variable gain amplifier 601 to cause the variable gain amplifier 601 to adjust the amplification of the high frequency components of the received signal.

In an alternate embodiment, the signal sampled for controlling the equalizer circuit may be the output of the delay line circuit (as in FIG. 3, for example). In such an embodiment, the output of the variable gain amplifier (or equalizer, 302) would be coupled to the input of the delay line circuit 303, and the output of the delay line circuit 303 would be sampled by the feedback circuit 304 to control the equalizer circuit 302.

Figure 6D:
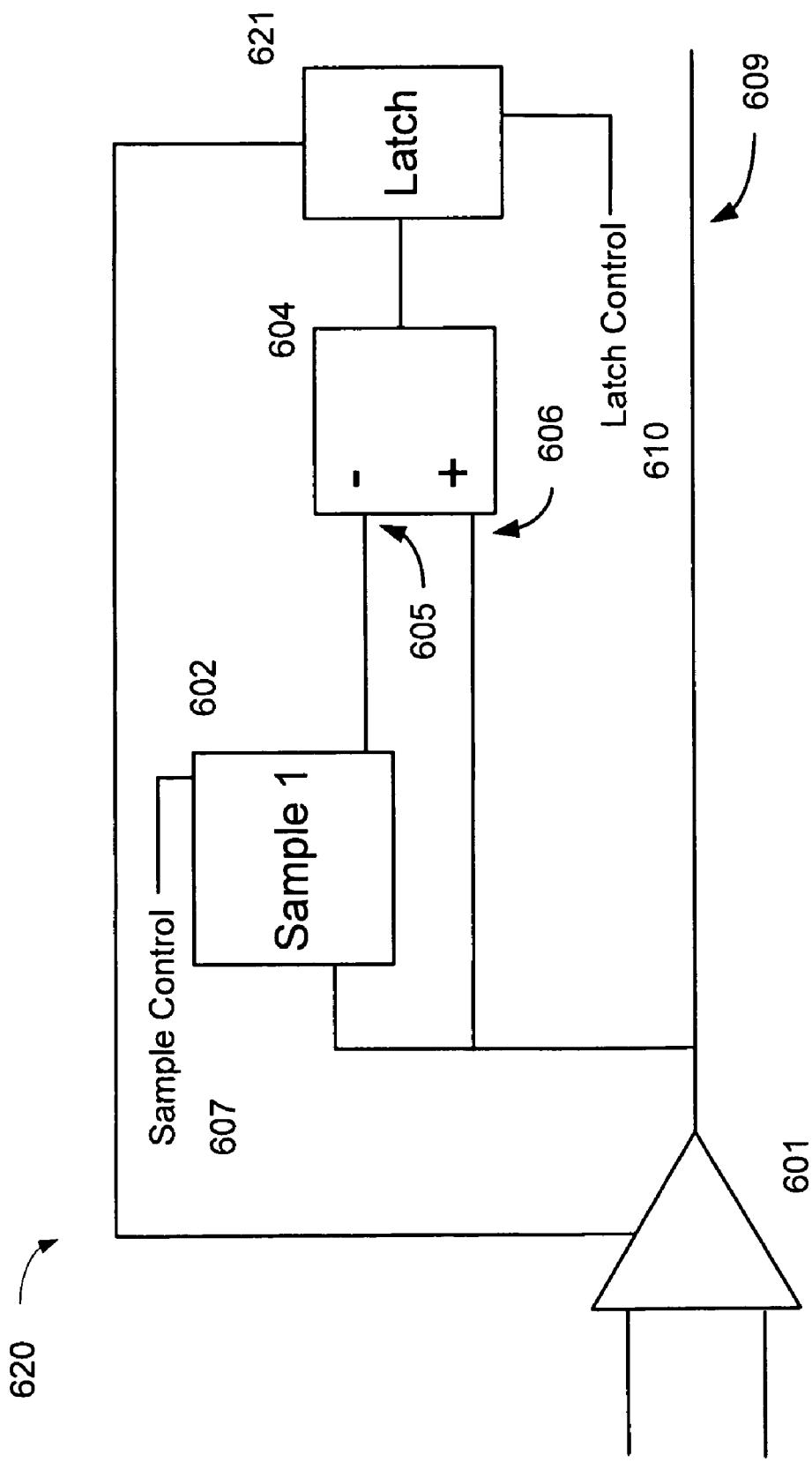
FIG. 6D schematically illustrates an alternate embodiment of an equalizer circuit.

An alternate embodiment is illustrated in FIG. 6D, which includes a latch 621 coupled to the output of the subtractor controller circuit 604. In this embodiment, a single sampling circuit 602 samples the incoming signal at a first time and its output is coupled to a first input 605 to the subtractor controller circuit 604. The incoming signal is coupled to the second input 606 of subtractor controller circuit 604. The subtractor controller circuit 604 produces an output representing the difference between the sample and the incoming signal. In some embodiments, the incoming signal may be sampled a second time, and that sample may be provided to the second input 606 of the subtractor controller circuit 604. The output of the subtractor controller circuit 604 may itself by sampled and held by a latch 621, which may consist, for example, of a sample-and-hold amplifier, or an analog-to-digital converter. The latch circuit 621 may be adapted to capture and hold the output of the subtractor controller circuit 604 for as long as necessary. The subtractor controller circuit 604 may also include circuitry that may condition the signal by, for example, adding or changing its DC offset, or further amplifying the signal in ways known in the art.

The delay line circuit (such as delay line 303 in FIG. 3) selectively delays certain signals with respect to other signals, as a function of a signal from the feedback circuit (e.g., "Delay Line Adjust" in FIG. 3). In some embodiments, the "Delay Line Adjust" signal is obtained by determining the order of arrival of two or more calibration pulses, applying zero delay to the last signal to arrive, and then further delaying the remaining signals until the calibration pulse edges are synchronous.

In an embodiment of the invention, a delay detector for the delay line adjustment is an XOR gate. In another embodiment of the invention, the delay detector is a logic circuit. The circuit uses the leading edge of the test pulses injected into the video lines, as received, in a pairwise fashion to determine the order of signal arrival on the video lines. After the first of the two edges in each pair arrives, the logic output latches into a state, indicating which edge arrived first for each pair of signals. For example, two logic bits can be output for each pair of lines. These outputs stay latched for the duration of the test pulse width, eliminating the need to sample at a high speed. Using three of these detectors, a 6-bit digital output can be produced, for example, indicating the order of arrival of the test pulse edges. These signals will be provided as inputs to a finite state machine, which will drive the Delay Line Adjust input, reducing signal skew in the video cables.

In a further embodiment of the invention for reducing skew among the video signals, the calibration signals from each line, as received and separated from the video signal, are input pairwise to a series of three phase/frequency detectors, each detector having two outputs. The value of each phase detector output is determined by which calibration signal pulse leading edge arrived first among the pair. The width of these output pulses are proportional to the delay between the two received test pulse leading edges for that phase detector. The phase detector outputs (6 in total) are then used to drive a series of charge pumps. These charge pumps add or remove charge from one of three capacitors. The resulting voltage on these capacitors can be used to drive the delay line directly (in analog mode), or passed through an analog to digital converter to drive the delay line digitally. The charge pumps are arranged such that the delay line which corresponds to the latest arriving signal is always adjusted down to the minimum delay, thus minimizing errors. The other two delay line adjustments would be increased until the loop was satisfied and the error at the input of the phase detector is minimized. The charge pump could be replaced by another filter structure, e.g., an integrator. This approach may be viewed as a variant of a delay locked loop.

The delay line may be implemented in a number of ways, as known by those of skill in the art. For example, a delay line may be formed by arranging a number of individual delay lines in series, where each individual delay line contributes a known amount of delay to the signal path. The variable delay line can be formed by selectively switching individual delay lines into or out-of the signal path.

Figure 7:
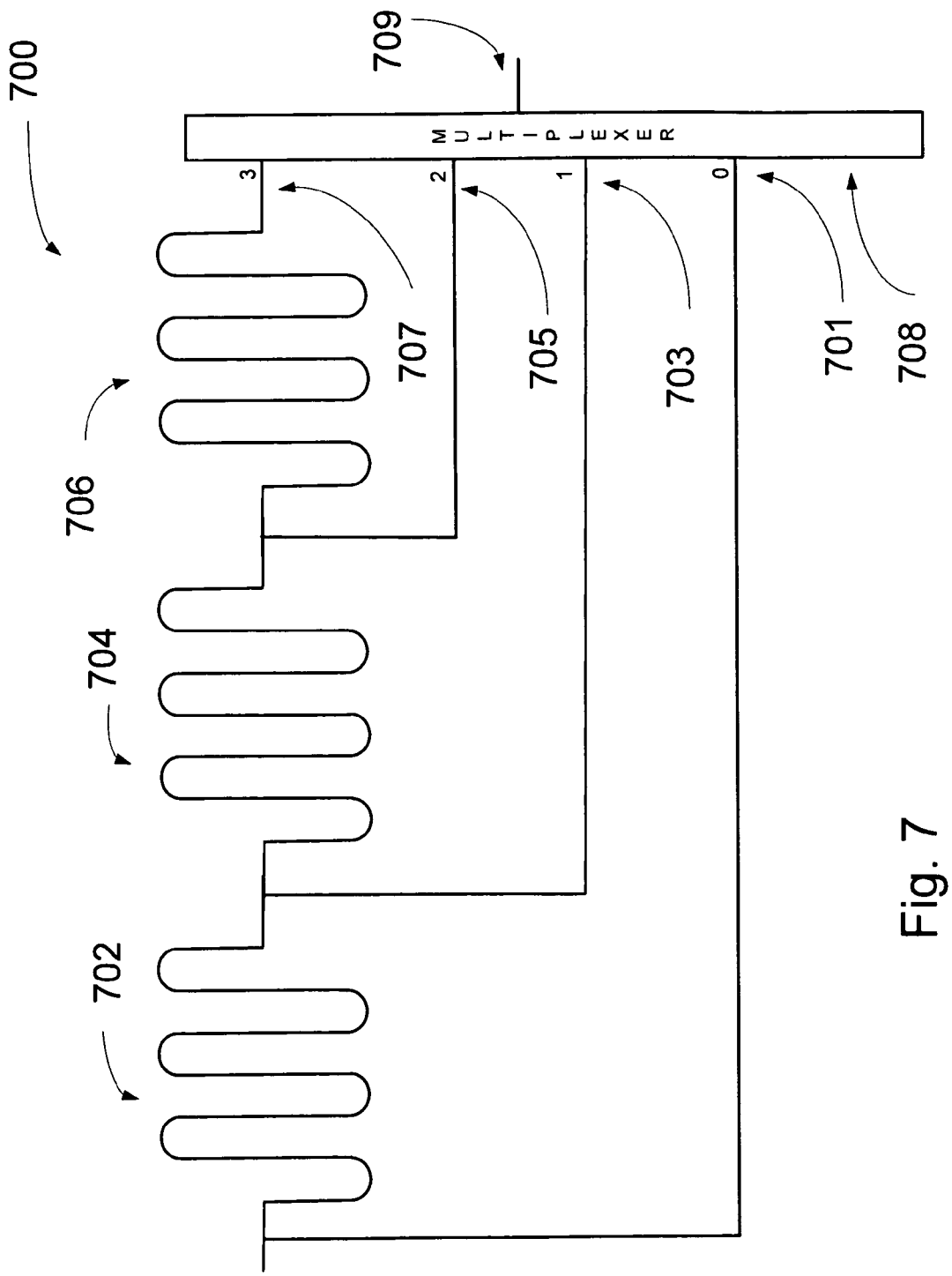
FIG. 7 schematically illustrates a selectable delay line.

A delay line can be as simple as a trace on a printed circuit board, such that the signal propagating through the delay line is delayed simply by the time it takes to pass through the length of the trace. FIG. 7 schematically illustrates a variable delay line 700 including three delay elements 702, 704 and 706, each of which is a trace on a printed circuit board. The incoming signal is coupled to one input 701 of a multiplexer 708, and also coupled to the input of a first delay element 702. The output of the first delay element 702 is coupled to the input of a second delay element 704, and also to a second input 703 of the multiplexer 708. The output of the second delay element 704 is coupled to the input of a third delay element 706 as well as a third multiplexer input 705. The output of the third delay element 706 is coupled to a fourth multiplexer input 707. In this example configuration, each input to the multiplexer presents a copy of the incoming signal with various amounts of delay. As such, the system could implement variable delay by selecting which input of the multiplexer 708 to couple through to the output 709 of the multiplexer 708.

A delay element could also be implemented using inductor-capacitor circuits. For example, it is known in the art to implement a delay line using various types of analog filters. Alternately, the signal could be sampled and converted by an analog-to-digital converter, and the samples stored digitally in a memory or register before being read-out and converted to an analog signal by a digital-to-analog converter after the desired delay.

In some applications, it may be desirable to adjust the delay to reduce the skew prior to adjusting (or making final adjustment to) the equalizer. For example, if a signal is substantially delayed in transmission so that the calibration pulse does not arrive at the expected time, the first sample of the calibration pulse may occur before the calibration pulse has arrived. If so, and if the second sample of the calibration pulse is within the calibration pulse, the difference between the two samples will indicate an inaccurate slope of the calibration pulse, which will cause the equalizer to incorrectly amplify the transmitted signal. Therefore, it may be desirable to compensate for the delay prior to assessing the signal attenuation.

However, detecting the rising edge of the calibration pulse may be difficult, or less accurate, if the received calibration pulse has not been equalized. Therefore, paradoxically, it may be desirable to address equalization first.

This situation may be addressed by first making at least a coarse adjustment to the delay of the incoming signals, and then sampling the calibration pulse for each signal. Even if the rising edge of the calibration pulse has lost some fidelity through, for example, attenuation of its high frequency components, the amplitude of the calibration pulse will likely still rise at some point and be detectable by an edge detector such as a comparator, for example. As such, at least a coarse adjustment to the delay lines can be made for each signal, with the result that the respective calibration pulses may be more accurately sampled in time. This may require adjusting the timing of the sampling control signals to match the delay of each incoming signal.

Once the signals have been delayed to a known time, the sampling for the equalization may be more accurate, and thus the equalization may be more accurate, and the process of determining the final amount of equalization for any of the signals may converge more quickly.

Therefore, in some embodiments, the sensing of the attenuation in the signal may occur after the signal has passed through the delay circuit. Such an arrangement is illustrated in FIG. 3, in which the video signal inputs to the feedback circuit 304 are taken from the outputs of the delay line 303. In some embodiments, several iterations of equalization and/or delay may occur, so that the fidelity of the signal may be improved with each iteration.

Figure 8A:
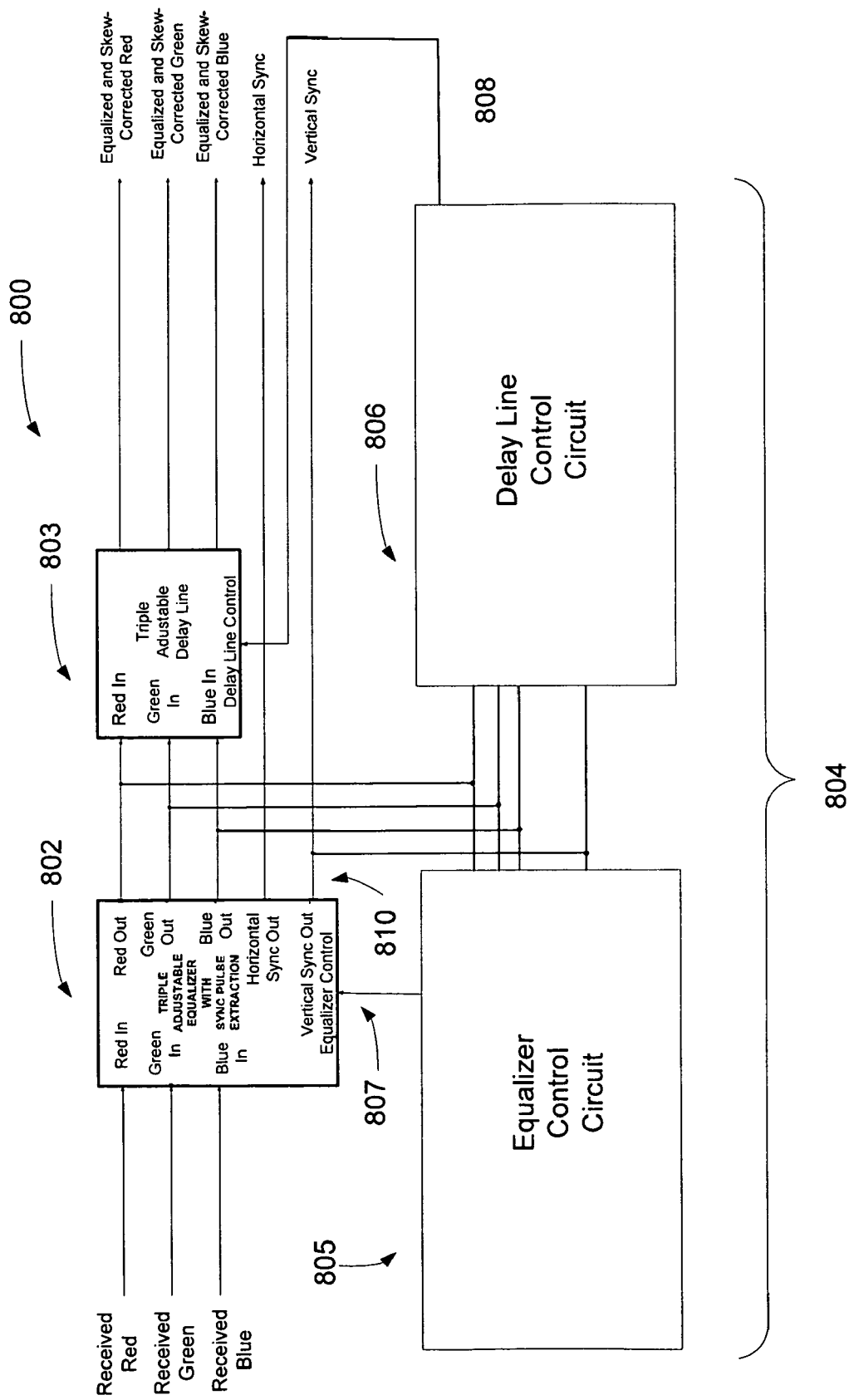
FIG. 8A schematically illustrates a compensation circuit with feedback elements.

One embodiment 800 is schematically illustrated in FIG. 8A, which includes a triple adjustable equalizer 802 and a triple adjustable delay line 803. In the circuit 800 of FIG. 8A, the feedback system 804 is schematically illustrated as having two distinct blocks: an equalizer control circuit 805 and a delay line control circuit 806. Each of these blocks has, as input, the Vertical Sync Out signal 810 from the triple adjustable equalizer 802, and at least one of the video signals. In FIG. 8A, the video signals input to the equalizer control 805 and delay line control 806 circuits are shown as coming from the output of the triple adjustable equalizer 802, although in other embodiments the video signals may be coupled to the control circuits from the output of the delay line 803 (for example, as shown in FIG. 3).

The equalizer control circuit 805 assesses the attenuation of a video signal (for example, by sampling a known calibration pulse to determine its slope), and sends a feedback signal (shown in FIG. 8A as "Equalizer Control" signal 807, which may also be known as "Equalizer Adjust") to the triple adjustable equalizer 802.

Figure 8B:
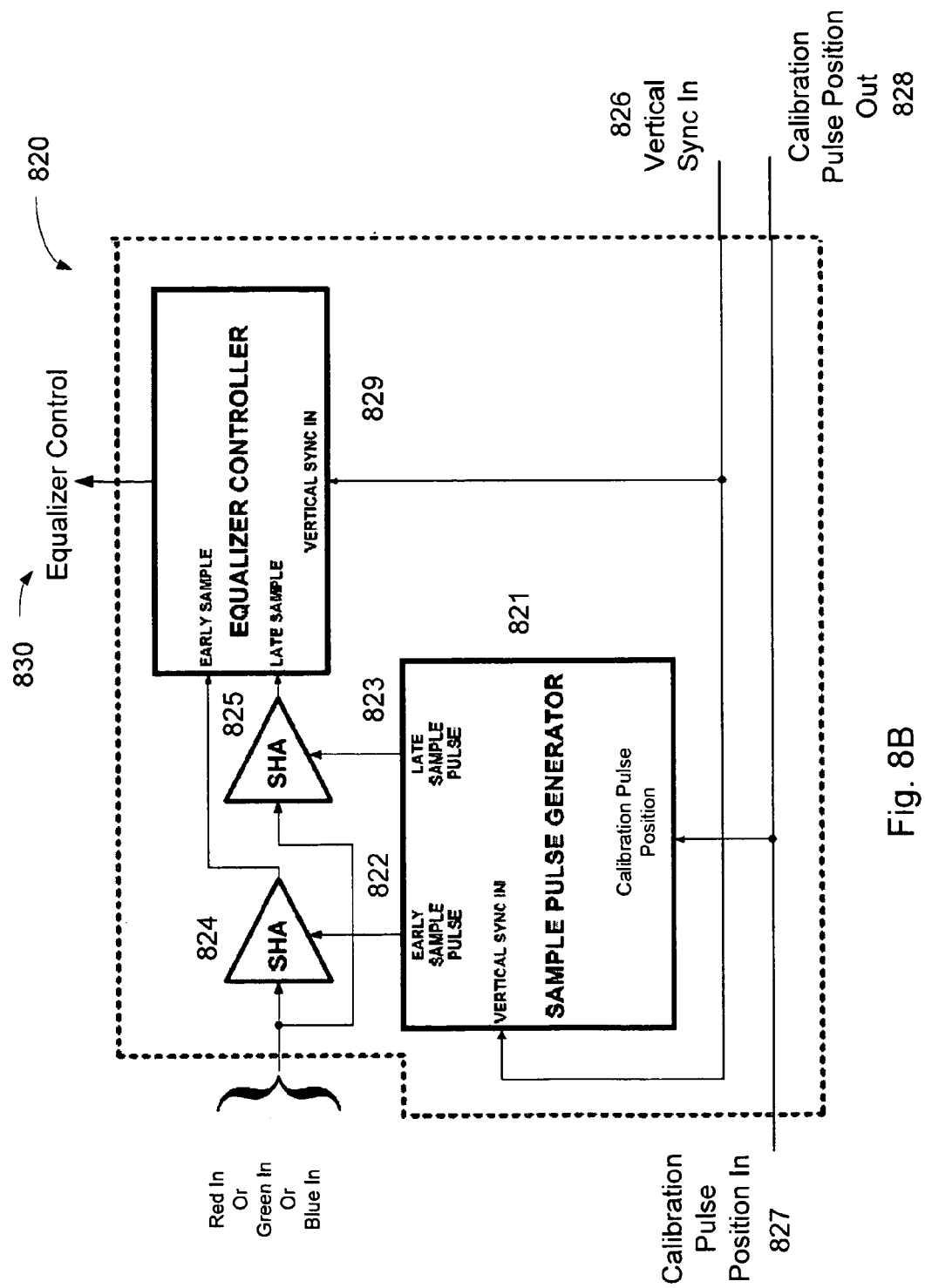
FIG. 8B schematically illustrates an equalizer control circuit.

An embodiment of an equalizer control circuit 805 is schematically illustrated in FIG. 8B. The sample pulse generator 821 produces sampling control signals 822 and 823 to the sample and hold amplifiers 824 and 825 so that they sample the incoming video signal at the appropriate time. If a calibration pulse is inserted into the vertical blanking interval of the video signal, the sample timing may be determined based on the receipt of the vertical sync input 826. However, if a calibration pulse is inserted into the video signal at a time other than in the vertical blanking interval, the sample pulse generator will receive input about the calibration pulse position from the signal on the "calibration pulse position" input 827. In some embodiments, the sample pulse generator 821 may consist of logic gates, flip-flops or other circuits that respond to the vertical sync input and/or calibration pulse position input to create one or more sample control signals (for example, "early sample pulse" 824 and "late sample pulse" 825) to the one or more sampling circuits.

The equalizer controller 829 may also include a latch to capture and hold the equalizer control circuit output 830, such that subsequent changes in the inputs to the equalizer controller 820 (for example, drooping outputs of the sample and hold amplifiers 824 and 825) do not cause the equalizer control signal 830 to change with time. Such a latch may be controlled by, for example the vertical sync input 826.

The delay line control circuit 806 assesses the various arrival times of the calibration pulses (for example, by measuring the arrival times of the leading edge of each pulse) and sends a feedback signal (shown in FIG. 8A as "Delay Line Control," which may also be known as "Delay Line Adjust") to the triple adjustable delay line 803.

Figure 8C:
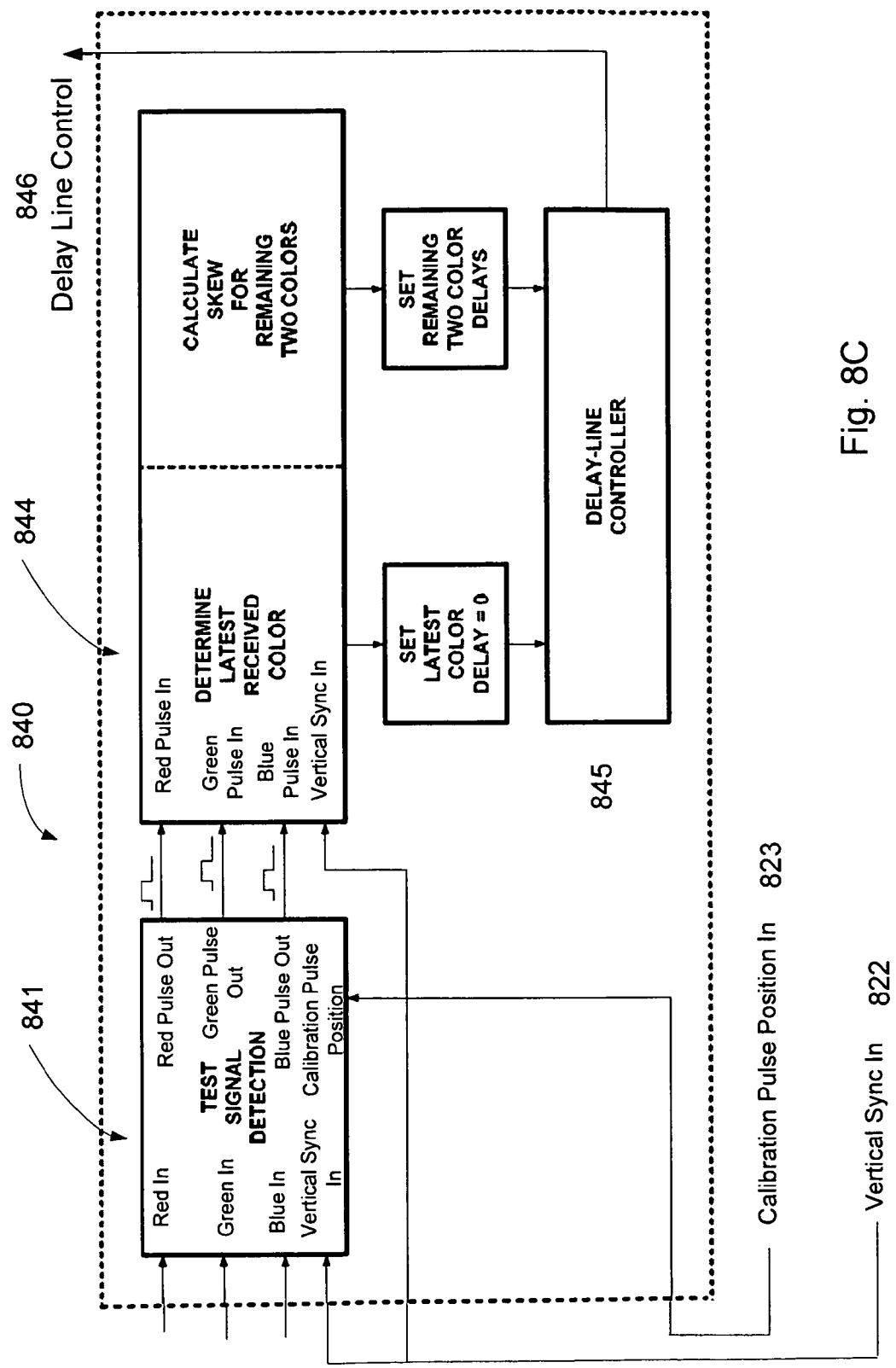
FIG. 8C schematically illustrates a delay line control circuit.

An embodiment of a delay line control circuit 840 is schematically illustrated in FIG. 8C. The video input signals are first processed to detect the calibration pulses. The detection circuit 841 may include, for example, comparators to detect and indicate the rising and falling edges of the calibration pulse. The output of the comparators may be enabled by the vertical sync input 822 and/or the test pulse position signal 823 so that the detector only reacts to the calibration pulses instead of other information in the video signal. Then, another circuit 844 detects the arrival times of the pulses, and calculates the skew of the pulses relative to the last pulse to arrive. The delay line controller 845 sets the delay for the last-arriving pulse to zero, and sets the delay for the other pulses to assure that those signals are delayed to be substantially synchronous with the last-arriving pulse. Finally, the delay line controller outputs the delay line control signals 846 (shown here as one line) to the delay line to implement the desired delays.

Figure 9:
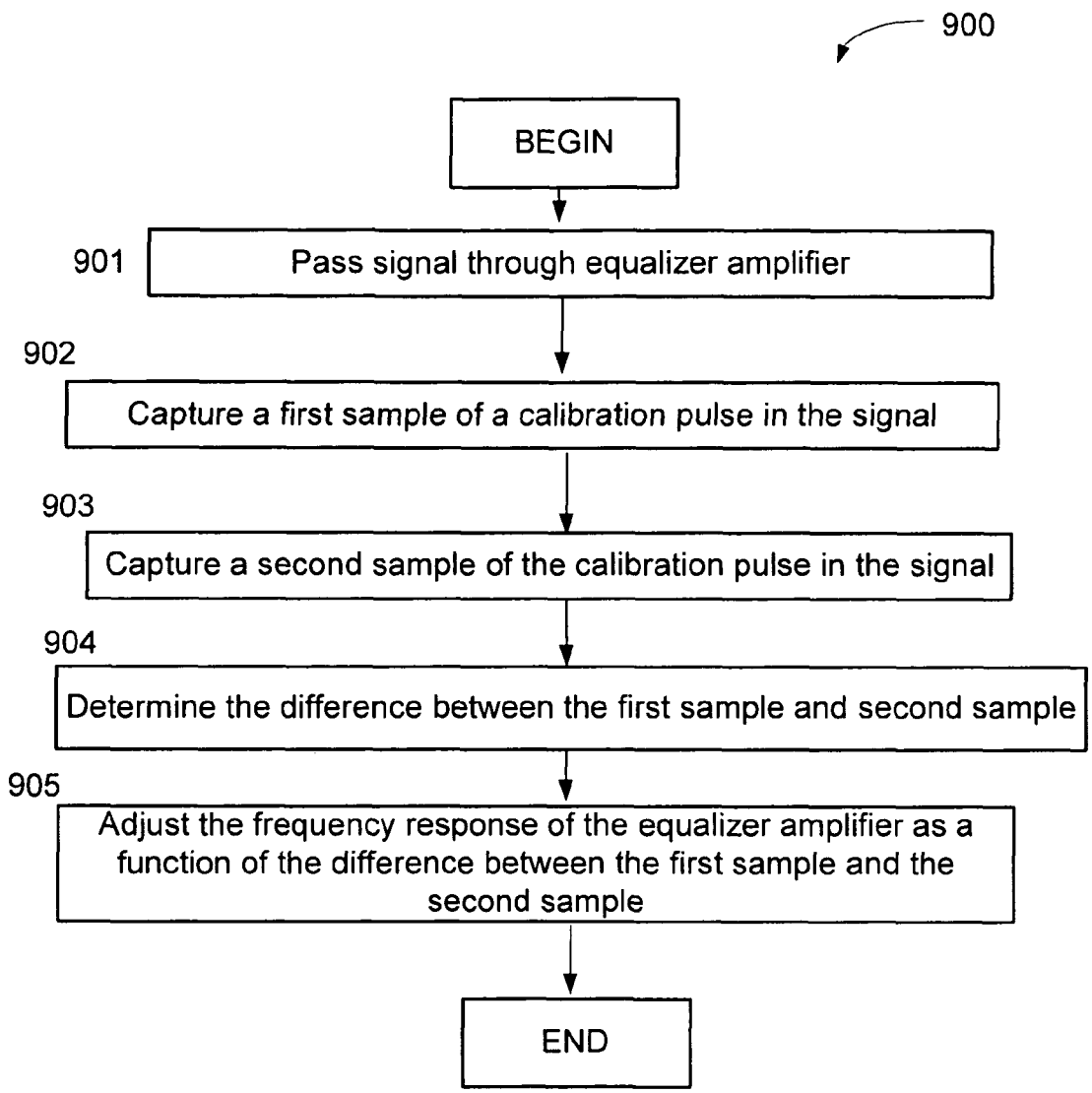
FIG. 9 is a flow chart illustrating an embodiment of a feedback method for signal equalization.

A flow chart 900 illustrating a method of feedback control to compensate for frequency attention in a signal is illustrated in FIG. 9. An incoming voltage signal, such as a video signal containing a calibration pulse, is first passed through an equalizer amplifier 901, and then sampled twice in succession 902 and 903. The voltage difference between the two samples is determined 904, the voltage difference representing the slope of the top of the calibration pulse, which would ideally be a slope of zero. Based on the slope of the calibration pulse, the frequency response of the equalizer amplifier is adjusted 905 by, for example, supplying to the equalizer amplifier a voltage representing the slope of the calibration pulse. Ideally, the signal passing through the equalizer amplifier will have its fidelity restored so that the magnitude of the slope of the calibration pulse is driven towards zero.

Figure 10A:
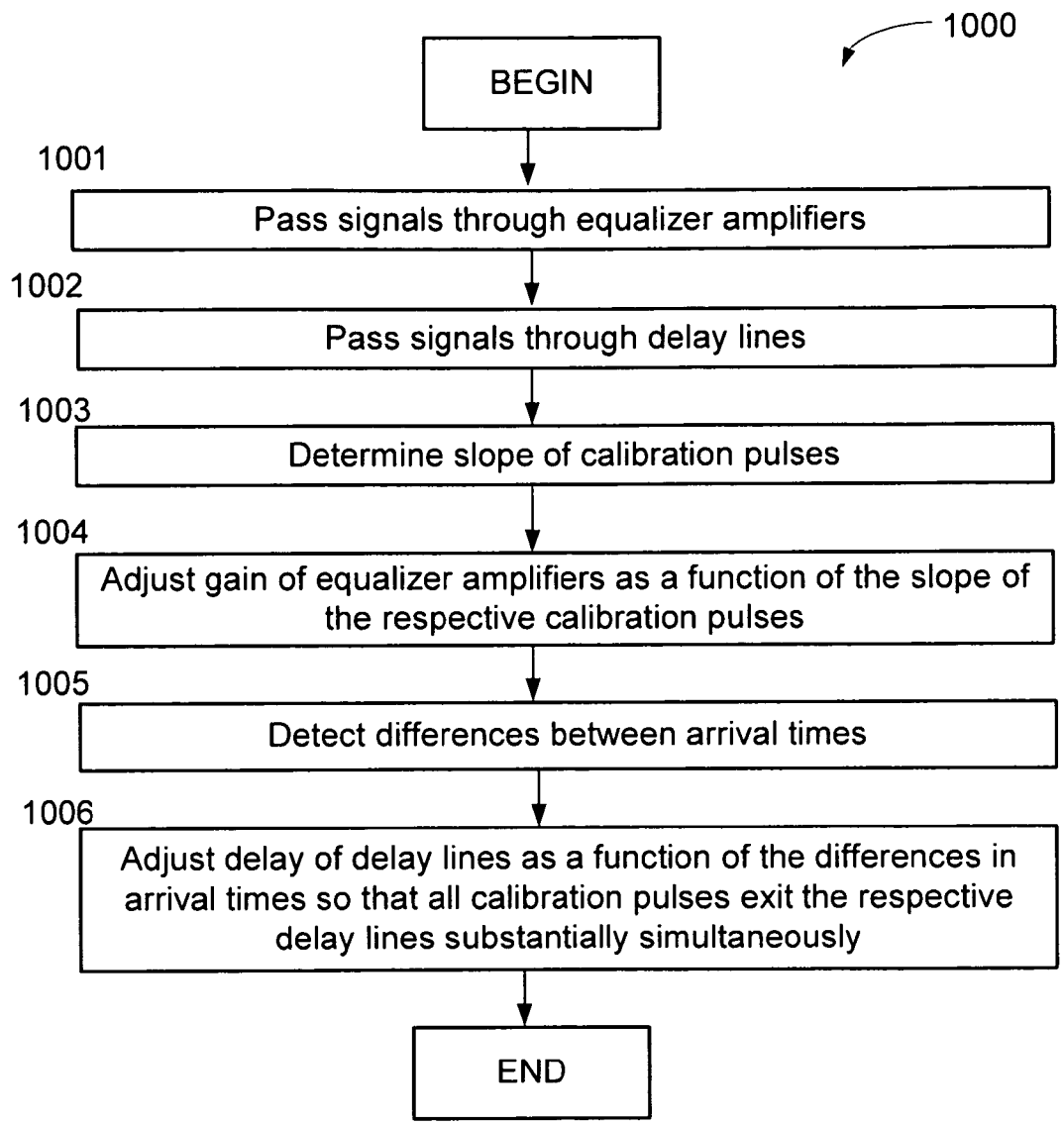
FIG. 10A and FIG. 10B are flow charts illustrating embodiments of feedback methods for signal equalization and signal skew compensation.
Figure 10B:
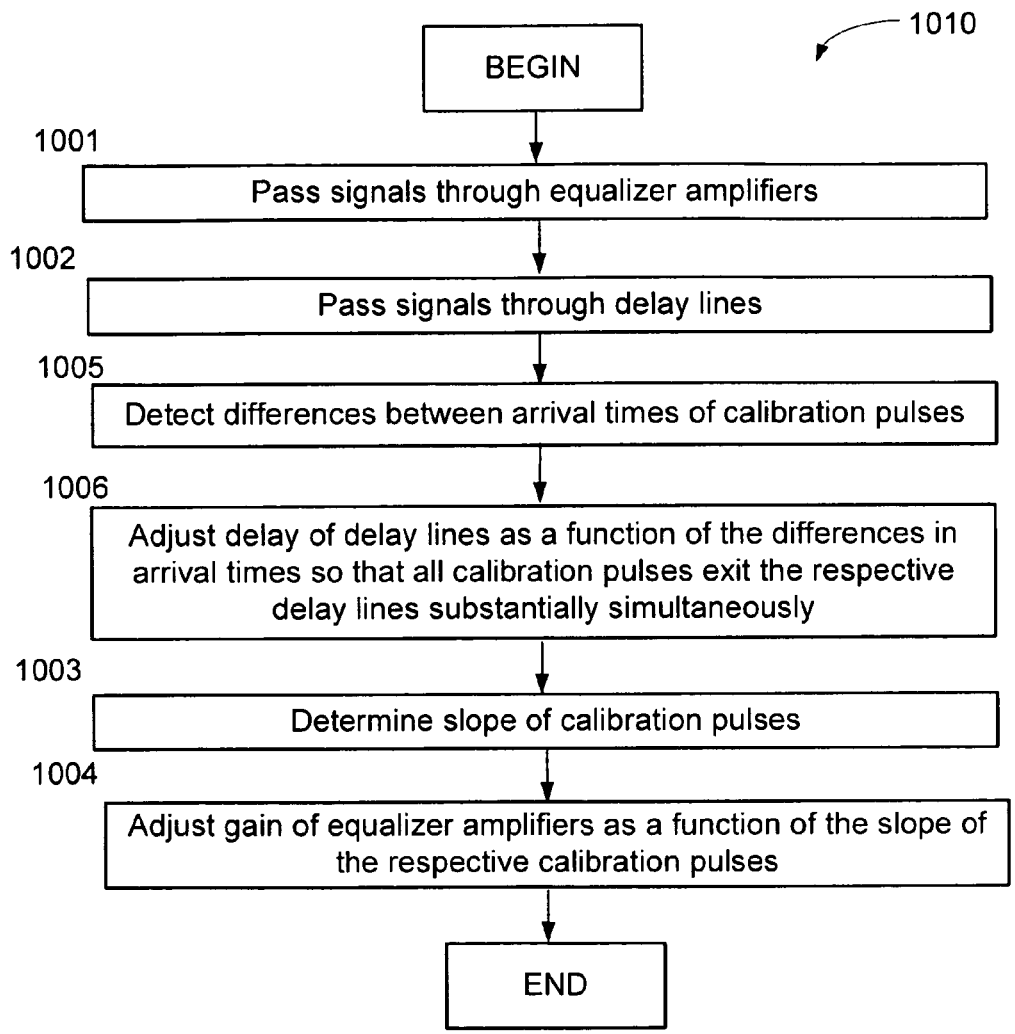

A flow chart 1000 illustrating a method of feedback control to compensate for both frequency attention and signal skew is illustrated in FIG. 10A. A plurality of incoming voltage signals, such as video signals that each contain a calibration pulse, are first passed through both equalizer amplifiers 1001 and delay lines 1002. Then, the frequency attenuation suffered by the calibration pulse of each signal is determined at the output of the equalizer amplifier or delay line (whichever is second in the signal chain) 1003, and the frequency response of a corresponding plurality of equalizer amplifiers is adjusted 1004 to counteract the attenuation. The arrival times of the various calibration pulses are detected 1005, and a corresponding plurality of delay lines are adjusted 1006 by applying zero delay to the last-to-arrive signal, while applying delay to the other signals so that all calibration pulses exit the delay lines substantially simultaneously. FIG. 10B is a flow chart 1010 illustrating an alternate embodiment of a method of feedback control to compensate for both frequency attention and signal skew, in which the skew is addressed prior to addressing the frequency attenuation. The order in which a signal passes through the equalizer circuit and the delay line circuit may not matter in some embodiments, as long as the feedback loop includes both the equalizer circuit and the delay line circuit in a single loop with the feedback circuit.

Embodiments of the present invention will facilitate the transmission of signals over conductors (for example, video signals over unshielded twisted pair) by compensating for signal attenuation and signal skew through application of a feedback circuit and method. Some embodiments may involve the dynamic reconfiguration of a circuit to sum various gain stages in an equalizer circuit, or sum various delay stages in a delay line, to implement the desired compensation.

Note that while sync pulses have been shown on the video signals for the above system and method, the methods and circuits described herein do not rely on the existence of sync pulses in the video signal, nor do sync pulses interfere with the operation of the compensation. Thus, these methods and systems may be adapted to work with video formats which do not have sync signals in the video or have sync signals on the common-mode and would also work with video formats which have sync signals present on one or more video line.

While the above exemplary embodiments of the invention have been described using UTP as the cabling example, the invention is not limited to such cabling. The above described system and method could be applied to systems using coaxial cable, for example, as the cabling medium. All such cabling media are intended to be within the scope of the invention. Accordingly, the embodiments of the invention described above are intended to be merely exemplary; numerous variations and modifications will be apparent to those skilled in the art. All such variations and modifications are intended to be within the scope of the present invention as defined in any appended claims.

What is claimed is:
1. A circuit for processing a transmitted signal including a calibration pulse, the circuit comprising:
an amplifying circuit having an equalizer input configured to receive the transmitted signal, an equalizer output, and an equalizer control input;
a sampling circuit comprising a first sample input coupled to the equalizer output, a first sample output, and a first sample control input, and wherein the sampling circuit further comprises:
an analog-to-digital converter configured to sample the calibration pulse of the transmitted signal at a first time to capture a first sample, and to sample the calibration pulse at a second time to capture a subsequent sample, the analog-to-digital converter comprising a converter input coupled to the equalizer output, a converter output, and a sample control input;

a storage medium having an input coupled to the converter output, and an a storage medium output, wherein the storage medium is configured to store the first sample of the calibration pulse;

a controller circuit comprising a first sample control output coupled to the first sample control input, wherein the sampling circuit samples the calibration pulse in response to a signal from the first sample control output; and a differencing circuit comprising a digital circuit configured to receive the first sample and the subsequent sample of the calibration pulse, and configured to subtract the first sample from the subsequent sample, wherein the difference between the first sample and the subsequent sample is a function of the slope of the calibration pulse, and a differencing output operably coupled to the equalizer control input.

2. The circuit of claim 1 wherein the sampling circuit comprises a second analog-to-digital converter configured to capture a second sample of the calibration pulse.

3. The circuit of claim 2, wherein the differencing circuit comprises a digital subtraction circuit.

* * * * *

UNITED STATES PATENT AND TRADEMARK OFFICE
CERTIFICATE OF CORRECTION

PATENT NO.         : 8,184,723 B2                                                Page 1 of 1
APPLICATION NO.    : 12/395279
DATED              : May 22, 2012
INVENTOR(S)        : DiSanto et al.

It is certified that error appears in the above-identified patent and that said Letters Patent is hereby corrected as shown below:

In Col. 11, line 2
replace "and an a storage"
with --and a storage--

Signed and Sealed this
Sixth Day of November, 2012

David J. Kappos
*Director of the United States Patent and Trademark Office*